United States Patent
Popek et al.

(10) Patent No.: US 11,711,042 B2
(45) Date of Patent: Jul. 25, 2023

(54) MOTOR DRIVE SYSTEM

(71) Applicant: Hamilton Sundstrand Corporation, Charlotte, NC (US)

(72) Inventors: Grzegorz Popek, Birmingham (GB); Stephen Minshull, Bromsgrove (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/551,360

(22) Filed: Dec. 15, 2021

(65) Prior Publication Data
US 2022/0200503 A1 Jun. 23, 2022

(30) Foreign Application Priority Data

Dec. 23, 2020 (EP) ..................... 20275191

(51) Int. Cl.
*H02P 27/14* (2006.01)
*H02P 27/06* (2006.01)

(52) U.S. Cl.
CPC ................... *H02P 27/06* (2013.01)

(58) Field of Classification Search
CPC .. H02P 27/06; H02P 27/14; H02P 6/00; B60L 50/50
See application file for complete search history.

(56) References Cited

U.S. PATENT DOCUMENTS

| 6,241,182 B1 | 6/2001 | Durandeau et al. |
| 7,109,679 B2 | 9/2006 | Edson et al. |
| 2003/0089826 A1 | 5/2003 | Barba |
| 2012/0091792 A1* | 4/2012 | Wu .......... B60L 50/50 307/10.1 |
| 2014/0300298 A1* | 10/2014 | Liu .......... H02P 27/14 318/380 |

(Continued)

FOREIGN PATENT DOCUMENTS

| DE | 102011109773 A1 | 2/2013 |
| DE | 102011113952 A1 | 3/2013 |

(Continued)

OTHER PUBLICATIONS

DE102011113952A1 Abstract.

(Continued)

*Primary Examiner* — Cortez M Cook
(74) *Attorney, Agent, or Firm* — Cantor Colburn LLP

(57) ABSTRACT

A motor drive system includes an input portion arranged to receive a DC input voltage across first and second conductors. An inverter is connected across the first and second conductors, and is arranged such that, in a normal mode, the inverter receives the DC input voltage and generates an AC drive voltage. A motor is connected to the inverter and is arranged such that, in the normal mode of operation, the motor receives the AC drive voltage. A first normally-open switch is connected along the first conductor between the input portion and the inverter. A damping controller comprising a second normally-closed switch and a damping means is connected in series between the first and second conductors. When the operated in the normal mode, the first switch is closed and the second switch is open. In a damping mode, the first switch is open and the second switch is closed.

16 Claims, 3 Drawing Sheets

(56) References Cited

U.S. PATENT DOCUMENTS

2015/0202978 A1* 7/2015 Hatanaka ................ B60L 50/61
                                                    701/19
2018/0022444 A1* 1/2018 Nakagawa ................ H02P 6/00
                                                    244/227

FOREIGN PATENT DOCUMENTS

| EP | 1902947 A2 | 3/2008 |
| WO | 2001090621 A1 | 11/2001 |
| WO | 2010033101 A1 | 3/2010 |

OTHER PUBLICATIONS

Abstract for DE102011109773 (A1), Published: Feb. 14, 2013, 1 page.
European Search Report for Application No. 20275191.3, dated Jun. 15, 2021, 8 pages.

* cited by examiner

MOTOR DRIVE SYSTEM

CROSS-REFERENCE TO RELATED APPLICATIONS

This application claims priority to European Patent Application No. 20275191.3 filed Dec. 23, 2020, the entire contents of which is incorporated herein by reference.

TECHNICAL FIELD

This disclosure relates to a motor drive system with a damping arrangement, particularly though not exclusively for use with flight control surfaces in aerospace applications.

BACKGROUND ART

In aerospace applications, there may be one or more motors that are supplied to drive actuators within the aircraft, where the commutation of these motors is generally controlled by a motor drive system. These motors are generally supplied with electrical power by a suitable voltage source that supplies electrical power such as a battery. Those skilled in the art will appreciate that the term 'aircraft' as used herein extends to any vehicle that can fly, including but not limited to airplanes, helicopters, airships, blimps, and powered gliders.

Typically in such motor drive systems, there is an inverter (i.e. a DC-to-AC power converter) that is connected between the voltage source and the motor(s) via suitable conductors (e.g. a cable arrangement), i.e. there is a conductive path between these components. This inverter takes the DC input voltage from the source and converts it to an AC supply voltage suitable for the motor (e.g. a three-phase supply voltage), which is then provided to the motor via an appropriate number of conductors. This AC supply voltage, generated by the inverter, is provided to the motor so as to cause the motor to rotate in a manner known in the art per se. The AC signal may, in some cases, be a pulse width modulated (PWM) drive signal. Thus the AC signal can be synthesised through a high frequency PWM pattern. Typically, the load(s) form(s) a low pass filter which attenuates the high frequency components of the PWM signal to leave a sinusoidal current waveform.

The motor is mechanically coupled to an actuator, e.g. to a flight control surface such as a wing flap, a spoiler, a rudder, or a tab. When actively being controlled by the motor, the actuator is controlled so as to move to a particular position so as to achieve desired flight characteristics. The flight control surfaces are critical components for safe aircraft operation and therefore multiple actuators are generally attached to each surface. A key requirement for each actuator is to implement a 'damping' mode in which a force is generated that opposes actuator movement where the force is approximately proportional to the speed of actuator operation.

The damping mode is needed to prevent 'flutter' on the flight control surface, i.e. to reduce the motion of the actuator in response to external stimuli such as vibrations of the aircraft and the force exerted on the actuator due to air passing over the flight surface (e.g. the wing or tail of the aircraft) during flight. When a given motor drive system is not being used to control the actuator, it is generally desirable for the actuator's motion to be damped.

Conventional damping systems, known in the art per se, make use of hydraulic damping arrangements. Such systems use a hydraulic valve or orifice in order to provide this damping function. Other systems make use of mechanical damping systems. However, there is an increasing interest in electric aircraft, and thus it is preferable to provide the damping using an electromechanical actuator (EMA) in order to avoid the need for hydraulic fluid or potentially heavy mechanical dampers. In such an actuator, rotational energy (typically generated with an electric motor) is directly transferred to linear motion with a roller screw or ball screw arrangement.

While there are some damping arrangements that use EMAs, known in the art per se, these typically require the use of additional hardware (e.g. substantial additional control electronics). Moreover, it has been appreciated that such systems generally require the damping mode to be actively enabled by a controller. While such an arrangement may provide a suitable damping function, it has been recognised that such a system may not provide the required damping in the event of power failure.

It would be advantageous to provide a motor drive system that addresses the problems outlined above.

SUMMARY OF THE DISCLOSURE

In accordance with a first aspect, the present disclosure provides a motor drive system. The system includes: an input portion arranged to receive a DC input voltage across first and second conductors; an inverter connected across the first and second conductors, said inverter being arranged such that, in a normal mode of operation, the inverter receives the DC input voltage and generates an AC drive voltage therefrom; a motor connected to the inverter, said motor being arranged such that, in the normal mode of operation, the motor receives the AC drive voltage; and a first switch connected along the first conductor between the input portion and the inverter, The first switch is a normally-open switch. The system can also include: a damping controller comprising a second switch and a damping means connected in series between the first and second conductors, wherein the second switch is a normally-closed switch. The damping controller is arranged such that: when the motor drive system is operated in the normal mode of operation, the first switch is closed and the second switch is open; and when the motor drive system is operated in a damping mode of operation, the first switch is open and the second switch is closed.

This first aspect of the present disclosure extends to an electromechanical actuation system comprising an actuator and the motor drive system outlined hereinabove, wherein the actuator is mechanically coupled to the motor. Thus, the present disclosure provides an electromechanical actuation system comprising a motor drive system, said motor drive system comprising: an input portion arranged to receive a DC input voltage across first and second conductors; an inverter connected across the first and second conductors, said inverter being arranged such that, in a normal mode of operation, the inverter receives the DC input voltage and generates an AC drive voltage therefrom; a motor connected to the inverter, said motor being arranged such that, in the normal mode of operation, the motor receives the AC drive voltage, wherein the actuator is mechanically coupled to the motor; and a first switch connected along the first conductor between the input portion and the inverter, wherein the first switch is a normally-open switch. The system further comprises a damping controller comprising a second switch and a damping means connected in series between the first and second conductors, wherein the second switch is a normally-closed switch. The damping controller is arranged such that:

when the motor drive system is operated in the normal mode of operation, the first switch is closed and the second switch is open; and when the motor drive system is operated in a damping mode of operation, the first switch is open and the second switch is closed.

Thus it will be appreciated that examples of the present disclosure provide an improved motor drive system in which the motor controller hardware can be utilised to provide a reliable damping function to improve performance of, for example, an application in which an actuator is mechanically coupled to the motor, where the damping function is reliably enabled in the absence of power. Specifically, during normal operation, the first switch is operated in the closed state and the second switch is operated in the open state, such that the input portion is electrically coupled to the inverter, providing the inverter with the DC input voltage for conversion to the AC drive voltage suitable for driving the motor. In this normal mode, the damping means is electrically decoupled from the circuit, i.e. the electrical flow path between the first and second conductors via the damping means is broken (open circuit).

In the damping mode, the first switch is operated in the open state and the second switch is operated in the closed state, such that the input portion is electrically decoupled from the inverter, i.e. the electrical flow path from the input portion to the inverter is broken (open circuit). The closed second switch then provides a shunt (short circuit) between the first and second conductors via the damping means.

The terms 'normally-open' and 'normally-closed' will be readily understood by those skilled in the art to mean that the switch in question defaults to the open or closed state respectively in the absence of power. As the first switch is normally-open and the second switch is normally-closed, this means that the motor drive system defaults to the damping mode in the absence of power. It will be understood by those skilled in the art that this is distinct from motor drive systems, known in the art per se, that provide a switched 'dynamic braking resistor' (DBR) across the conductors, because such systems typically use a normally-open switch in line with the DBR as the desired behaviour of such a system is for the DBR to be 'switched in' to the circuit only during a braking operation. Conversely, the second switch being normally-closed is particularly advantageous for the damping function desired of the motor drive system of the present disclosure.

This damping function helps to alleviate any issues caused by mechanical movement of an actuator that is mechanically coupled to the motor when installed, e.g. in an aerospace application such as on board an aircraft. If the actuator moves in response to the external environment, for example if a flap on an aircraft wing moves in response to a force from the air moving over the wing's surface, or in response to vibrations of the aircraft, this can in turn cause movement of the motor due to the mechanical coupling between the motor and the actuator. The movement of the motor causes a generation of a back electromotive force (or 'back-EMF') at the terminals of the motor. Thus the principles of the present disclosure are particularly applicable to arrangements in which the motor produces a back-EMF when moved (e.g. due to an external stimulus or force). In some examples, the motor comprises a permanent magnet type motor. In such an arrangement, the back-EMF may be generated by the permanent magnet(s) when the motor is moved.

With the second switch closed and the first switch opened in the damping mode (either due to the motor drive system actively being operated in the damping mode or due to a power failure), the current resulting from the back-EMF is routed through the damping means via the inverter, which acts as a passive rectifier in the damping mode. This passive rectification behaviour means that the back-EMF from the motor is rectified as the resulting current passes through the inverter in the 'reverse' direction. This may be achieved using a 'voltage source inverter', which may comprise first and second diodes arranged in an antiparallel arrangement, i.e. in which the anode of the first diode is connected to the cathode of the second diode, the cathode of the first diode is connected to the first conductor, and the anode of the second diode is connected to the second conductor.

The inverter may be a three-phase inverter. As such, in some such embodiments, the inverter includes: a first phase leg comprising first and second diodes arranged in antiparallel such the anode of the first diode is connected to the cathode of the second diode, the cathode of the first diode is connected to the first conductor, and the anode of the second diode is connected to the second conductor.

The inverter can optionally include a second phase leg comprising third and fourth diodes arranged in antiparallel such the anode of the third diode is connected to the cathode of the fourth diode, the cathode of the third diode is connected to the first conductor, and the anode of the fourth diode is connected to the second conductor; and The inverter can optionally include a third phase leg comprising fifth and sixth diodes arranged in antiparallel such the anode of the fifth diode is connected to the cathode of the sixth diode, the cathode of the fifth diode is connected to the first conductor, and the anode of the sixth diode is connected to the second conductor.

In some examples, a DC link capacitor is connected between the first and second conductors. Generally, the DC link capacitor is connected across the input of the inverter, i.e. between the damping controller and the inverter such that in the 'normal mode', the DC link capacitor is 'downstream' of the input portion and damping controller, and 'upstream' of the inverter.

As such, in a particular set of embodiments in which the inverter comprises antiparallel diodes as outlined above, the DC link capacitor may be connected between the anode of the second diode and the cathode of the first diode. Where a three phase inverter with antiparallel diodes is provided as outlined above, the DC link capacitor may additionally or alternatively be connected between the anode of the fourth diode and the cathode of the third diode. Additionally or alternatively, the DC link capacitor may be connected between the anode of the sixth diode and the cathode of the fifth diode.

Thus it will be appreciated that the arrangement of the present disclosure may advantageously utilise components of a typical motor drive system (e.g. the inverter) for the damping function, generally with the provision of some additional switches (i.e. the first and second switches) and a suitable damping means.

The resulting current through the damping means gives rise to a torque that opposes the motion of the motor, thereby damping motion of the actuator. Moreover, the arrangement of the present disclosure advantageously utilises the inverter to provide passive rectification of the motor currents (which are typically generated as AC currents) to DC before the energy is, for example, dissipated or harvested in accordance with certain examples outlined hereinbelow. This is simpler than switching resistances across the motor phases.

Thus the arrangement of the present disclosure damps motion of the motor (and thus of an actuator coupled to that motor) in the damping mode, and defaults to that damping mode in the absence of power (e.g. due to a power failure or similar issue).

The second switch may, in some examples, be controlled with a control signal having a variable duty cycle. When power is available (i.e. in the 'controlled' damping mode, rather than the power failure damping mode), the duty cycle of the control signal may be varied in order to adjust the damping profile of the damping controller. This control signal may, for example, be a PWM signal. The control signal may be generated by the damping controller, or it may be supplied by an external controller or signal generator, as appropriate.

In some examples, the motor drive system comprises an actuator mechanically coupled to the motor. This actuator may be further mechanically coupled to a flight control surface in an aerospace application, e.g. a wing flap, a spoiler, a rudder, a tab, aileron, or elevator. Other types of actuators that need to fail to a damped state include, for example, landing gear actuators.

In some examples, the damping means comprises a dissipative component. In a particular set of such examples, the damping means comprises a resistor. A plurality of resistors (e.g. in series, in parallel, or in some combination thereof), may be used as appropriate to achieve a particular resistance of the dissipative component. It will be appreciated that where the damping means comprises such a dissipative component, the energy transferred from the motor is converted to heat.

While the energy from the motor could simply be 'wasted' as heat by using a dissipative component as outlined above, in a potentially overlapping set of examples, the damping means may comprise an energy harvesting arrangement arranged to capture energy from the motor when the motor moves in response to an external force. This energy harvesting arrangement thus provides a regenerative component that allows the energy from the motor to be diverted into useful applications. In some cases, this may involve directly regenerating the energy from the motor into the source of the DC input voltage, however in some examples the energy harvesting arrangement may be arranged to store at least part of the energy 'harvested' from the motor in a suitable energy storing means (i.e. 'energy reservoirs'), such as a cell, battery, capacitor, flywheel, or similar, such that the energy can be used later for some other purpose. This may be more efficient than converting the energy from the motor to wasted heat. Advantageously, such an arrangement may, for example, be used to replace existing 'pre-charge' circuits for the DC link capacitor, where provided. This same arrangement may also be used to enable regeneration of energy during motor deceleration (i.e. braking).

The first and second switches may each respectively comprise a suitable type of switching device, i.e. a device that can selectively enable or disable a current flow path through the device, e.g. in response to the state of a control signal (or lack thereof). In some examples, the first switch comprises at least one of: a transistor, such as a field-effect-transistor (FET), a metal-oxide-semiconductor FET (MOSFET), or a bipolar junction transistor (BJT); a thyristor; or a relay. Similarly, in some potentially overlapping examples, the second switch comprises at least one of: a transistor, such as a FET, a MOSFET, or a BJT; a thyristor; or a relay.

In some examples, the first conductor comprises a positive power supply rail and the second conductor comprises a negative power supply rail (or ground).

The input portion may, in some examples, be arranged for connection to an external voltage source. However, in other examples, the motor drive system itself comprises an internal voltage source, wherein the input portion is connected to said internal voltage source. Certain examples are envisioned where a combination of internal and/or external voltage sources supply the motor drive system. In a particular set of examples, the voltage source comprises a battery. In a potentially overlapping set of examples, the voltage source comprises a passive and/or active rectifier.

BRIEF DESCRIPTION OF THE DRAWINGS

Certain examples of the present disclosure will now be described with reference to the accompanying drawings, in which.

DETAILED DESCRIPTION

Figure 1:
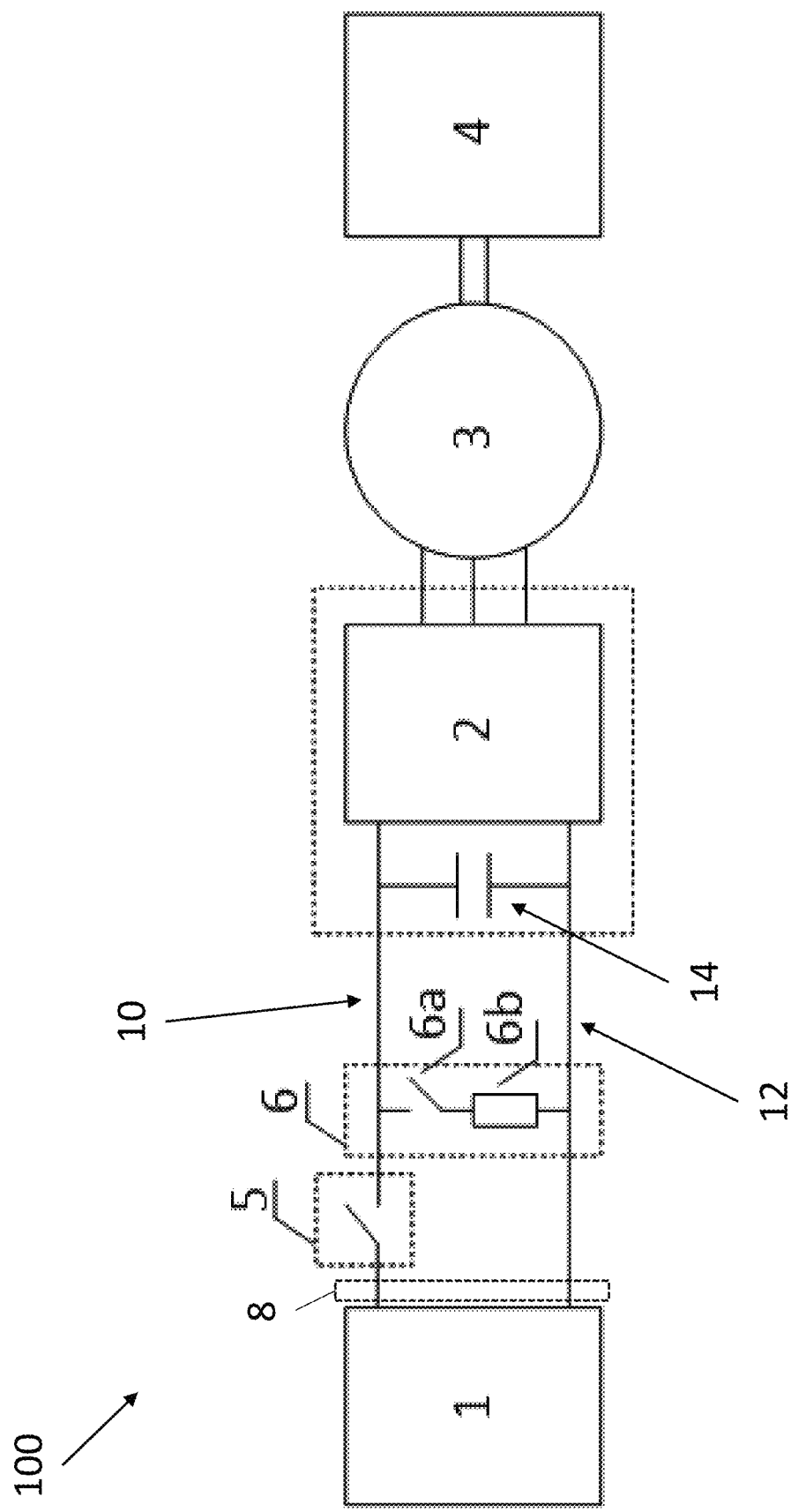
FIG. 1 is a schematic diagram of a motor drive system with a dissipative damping means in accordance with an example of the present disclosure.

FIG. 1 is a schematic diagram of a motor drive system 100 with a dissipative damping means in accordance with an example of the present disclosure. The motor drive system 100 is connected to a DC voltage source 1, which in this particular example is a battery, however alternative DC voltage sources such as passive or active rectifiers could readily be used instead.

The motor drive system 100 comprises an inverter 2; a motor 3; an actuator 4; a first switch 5; and a damping controller 6.

An input portion 8 is arranged to receive the DC input voltage from the voltage source 1 across first and second conductors 10, 12, where the first conductor 10 is the positive DC supply rail and the second conductor 12 is the negative DC supply rail (or ground).

The inverter 2 is connected across the first and second conductors 10, 12 such that, subject to the state of the first switch 5 and the damping controller 6 as outlined in further detail below, the inverter 2 receives the DC input voltage from the voltage source 1. As will be understood by those skilled in the art, the inverter 2 converts the DC input supply to an AC drive voltage suitable for driving the motor 3. The motor 3 is a permanent magnet type motor, and as such is capable of generating a back-EMF (i.e. by the permanent magnets).

The first switch 5 is a normally-open switch (i.e. it is open in the absence of power), and may be any suitable power electronic commutating device (e.g. a FET, MOSFET, BJT, thyristor, etc.). When the motor drive system 100 is operated in a first 'normal' mode of operation, the first switch 5 is closed such that the motor 3 is electrically connected to the inverter 2 such that the motor 3 receives the AC drive voltage generated by the inverter 2.

The damping controller 6 comprises a second switch 6a and a dissipative component, in this case a resistor 6b, that acts as a damping means. This second switch 6a and resistor 6b are connected in series with one another, and such that they are positioned between the first and second conductors 10, 12. This second switch 6a is a normally-closed switch (i.e. it is closed in the absence of power), and may be any suitable device (e.g. a FET, MOSFET, BJT, thyristor, etc.). Generally, the switch 6a will be some form of transistor (i.e.

a three terminal device), where current can flow from a first (e.g. source) terminal to a second (e.g. drain) terminal, depending on the state of a third 'control' (e.g. gate) terminal, for example based on a voltage applied to that third control terminal.

The damping controller 6 is arranged such that when the motor drive system 100 is operated in the normal mode of operation, the first switch 5 is closed and the second switch 6a is open. Conversely, when the motor drive system 100 is operated in a damping mode of operation, the first switch 5 is open and the second switch 6a is closed.

The actuator 4 may comprise a flight control surface on an aircraft, for example a wing flap. Any mechanical movement of the actuator 4 causes movement of the motor 3 due to the mechanical coupling of the motor 3 and actuator 4. Movement of the motor 3 causes the generation of a back-EMF at the terminals of the motor 3.

When not being used to drive the motor, the inverter 2 acts as a passive rectifier and builds the voltage on a DC link capacitor 14 connected across the input of the inverter 2. The dissipative damping controller 6 dissipates the resultant energy transferred from the motor 3 into heat as the current is passed through the resistor 6b (due to the second switch 6a being closed).

The current which flows during energy transfer during movement produces a mechanical torque which dampens the movement of the actuator 4.

As the second switch 6a is a normally-open switch, this enables damping operation when the actuator 4 is not powered.

Figure 2:
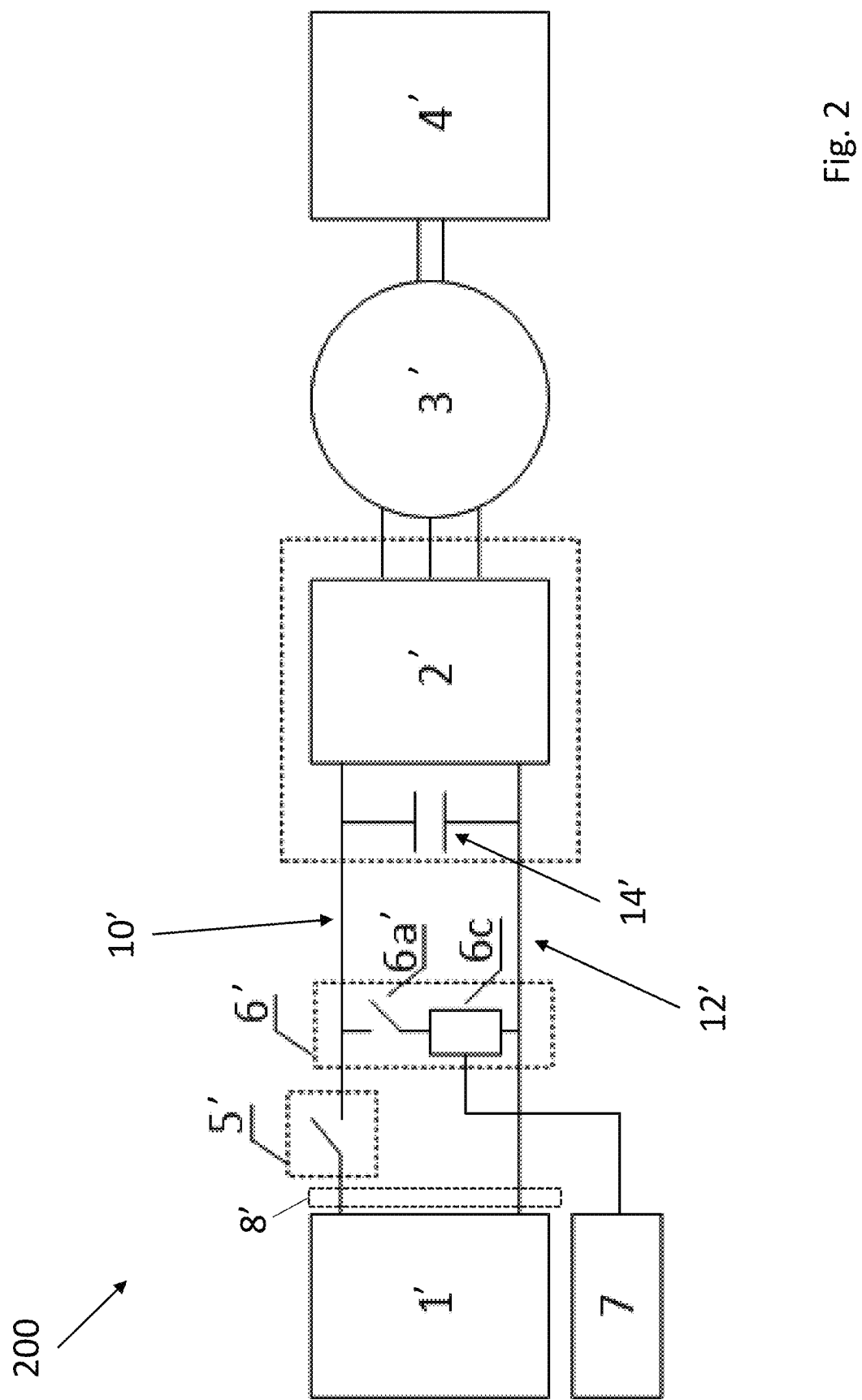
FIG. 2 is a schematic diagram of a motor drive system with a regenerative damping means in accordance with a further example of the present disclosure.

FIG. 2 is a schematic diagram of a motor drive system 200 with a regenerative damping means in accordance with a further example of the present disclosure. The arrangement of FIG. 2 is similar in structure and function to the motor drive system 100 of FIG. 1. As such, for ease of reference, components having a reference numeral appended with a prime symbol (') are alike in structure and function to those components having the same reference numeral without the prime symbol described previously with reference to FIG. 1, unless context dictates otherwise.

In this second example, an active/regenerative damping means is utilised instead of the dissipative damping means used in the example of FIG. 1. Specifically, the damping controller 6' comprises a second switch 6a' as before, however the resistor 6b used in FIG. 1 is replaced with an auxiliary power converter 6c.

This auxiliary power converter 6c is interfaced with a battery 7, however it could readily be interfaced with some other energy storage means or DC grid. The power converter 6c also enables discharge of the DC link compactor 14' by transferring energy from the capacitor 14' into the battery 7, which acts as an energy reservoir.

In special cases, and if supported by the DC voltage source 1' (e.g. a battery or an active rectifier), the energy from the capacitor 14' could be directly regenerated into the main DC voltage source 1'. For example, when the system 200 is fully powered and the controller 6' is able to actively rectify the power from the motor 3', the energy from the capacitor 14' may be regenerated into the main DC voltage source 1' directly.

This regenerative power converter 6c can also be used to pre-charge the DC link capacitor so as to limit the initial 'inrush current' when the first switch 5' is closed (i.e. when entering normal operation). During deceleration of the motor 3', the power converter 6c can also be used to regenerate braking energy.

Figure 3:
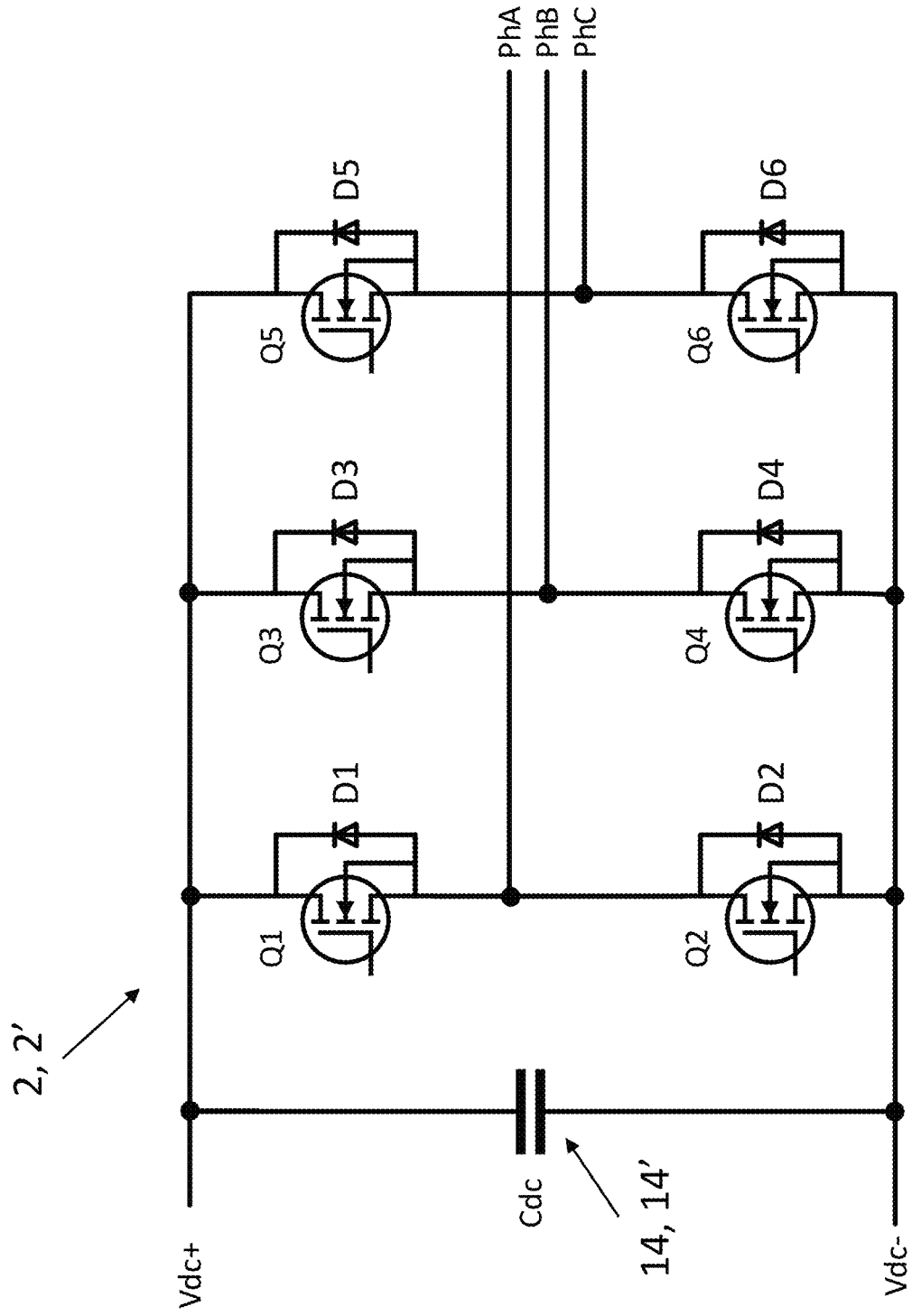
FIG. 3 is a schematic circuit diagram of an inverter for use in the motor drive systems of FIGS. 1 and 2.

FIG. 3 is a schematic circuit diagram of an inverter 2, 2' for use in the motor drive systems 100, 200 of FIGS. 1 and 2. As can be seen from the figure, six switching transistors Q1-6 and associated antiparallel diodes D1-6 are arranged in three 'phase legs', such that: Q1 and Q2 provide the switching for a first phase PhA; Q3 and Q4 provide the switching for a second phase PhB; and Q5 and Q6 provide the switching for a third phase PhC.

When an external force causes the motor to generate a back-EMF, the appropriate antiparallel diodes D1-D6 act as a passive rectifier. This builds the voltage on the DC link capacitor 14, 14' (Cdc) that is connected across the input of the inverter 2, 2' as outlined above. In effect, the DC link capacitor 14, 14' sits between the anode of the 'lower' diode (i.e. D2, D4, D6) and the cathode of the 'upper' diode (i.e. D1, D3, D5) in each phase leg.

Thus it will be appreciated that aspects of the present disclosure provide an improved motor drive system in which damping is provided for electromechanical actuation systems without needing hydraulics, and that can make use of existing hardware already in a typical motor controller. Importantly, the system reverts to damping more under power failure conditions. While specific examples of the disclosure have been described in detail, it will be appreciated by those skilled in the art that the examples described in detail are not limiting on the scope of the disclosure.

The invention claimed is:

1. A motor drive system comprising:
an input portion arranged to receive a DC input voltage across first and second conductors;
an inverter connected across the first and second conductors, said inverter being arranged such that, in a normal mode of operation, the inverter receives the DC input voltage and generates an AC drive voltage therefrom;
a motor connected to the inverter, said motor being arranged such that, in the normal mode of operation, the motor receives the AC drive voltage; and
a first switch connected along the first conductor between the input portion and the inverter, wherein the first switch is a normally-open switch;
a damping controller comprising a second switch and a damping means connected in series between the first and second conductors, wherein the second switch is a normally-closed switch;
wherein the damping controller is arranged such that:
when the motor drive system is operated in the normal mode of operation, the first switch is closed and the second switch is open;
when the motor drive system is operated in a damping mode of operation, the first switch is open and the second switch is closed; and
wherein the second switch is controlled with a control signal having a variable duty cycle.

2. The motor drive system as claimed in claim 1, wherein a DC link capacitor is connected between the first and second conductors.

3. The motor drive system as claimed in claim 1, wherein the motor drive system comprises an actuator mechanically coupled to the motor.

4. The motor drive system as claimed in claim 1, wherein the damping means comprises a dissipative component.

5. The motor drive system as claimed in claim 1, wherein the damping means comprises an energy harvesting arrangement arranged to capture energy from the motor when the motor moves in response to an external force.

6. The motor drive system as claimed in claim 5, wherein the energy harvesting arrangement is arranged to store at least part of the energy harvested from the motor in a suitable energy storing means.

7. The motor drive system as claimed in claim 1, wherein the inverter comprises:
a first phase leg comprising first and second diodes arranged in antiparallel such the anode of the first diode is connected to the cathode of the second diode, the cathode of the first diode is connected to the first conductor, and the anode of the second diode is connected to the second conductor.

8. The motor drive system as claimed in claim 7, wherein the inverter further comprises:
a second phase leg comprising third and fourth diodes arranged in antiparallel such the anode of the third diode is connected to the cathode of the fourth diode, the cathode of the third diode is connected to the first conductor, and the anode of the fourth diode is connected to the second conductor; and
a third phase leg comprising fifth and sixth diodes arranged in antiparallel such the anode of the fifth diode is connected to the cathode of the sixth diode, the cathode of the fifth diode is connected to the first conductor, and the anode of the sixth diode is connected to the second conductor.

9. The motor drive system as claimed in claim 1, wherein the first switch comprises at least one of: a transistor, such as a field-effect-transistor (FET), a metal-oxide-semiconductor FET (MOSFET), or a bipolar junction transistor (BJT); a thyristor; or a relay.

10. The motor drive system as claimed in claim 1, wherein the second switch comprises at least one of: a transistor, such as a field-effect-transistor (FET), a metal-oxide-semiconductor FET (MOSFET), or a bipolar junction transistor (BJT); a thyristor; or a relay.

11. The motor drive system as claimed in claim 1, wherein the first conductor comprises a positive power supply rail and the second conductor comprises a negative power supply rail or ground.

12. The motor drive system as claimed in claim 1, wherein the input portion is arranged for connection to an external voltage source.

13. The motor drive system as claimed in claim 12, wherein the external voltage source and/or internal voltage source comprises a battery, a passive rectifier, or an active rectifier.

14. The motor drive system as claimed in claim 1, wherein the motor drive system comprises an internal voltage source, wherein the input portion is connected to said internal voltage source.

15. An electromechanical actuation system comprising:
an actuator;
a motor drive system as claimed in claim 1;
wherein the actuator is mechanically coupled to the motor.

16. The electromechanical actuation system as claimed in claim 15, wherein the actuator is further mechanically coupled to a flight control surface.

* * * * *